(12) United States Patent
Dolder et al.

(10) Patent No.: US 10,789,920 B1
(45) Date of Patent: Sep. 29, 2020

(54) CLOUD-BASED MEDIA SYNCHRONIZATION SYSTEM FOR GENERATING A SYNCHRONIZATION INTERFACE AND PERFORMING MEDIA SYNCHRONIZATION

(71) Applicant: Thirty3, LLC, Las Vegas, NV (US)

(72) Inventors: Kyle Dolder, Las Vegas, NV (US); Richard A. Duggan, Henderson, NV (US)

(73) Assignee: Thirty3, LLC, Las Vegas, NV (US)

( * ) Notice: Subject to any disclaimer, the term of this patent is extended or adjusted under 35 U.S.C. 154(b) by 0 days.

(21) Appl. No.: 16/686,689

(22) Filed: Nov. 18, 2019

(51) Int. Cl.
*G10H 1/00* (2006.01)

(52) U.S. Cl.
CPC ......... *G10H 1/0008* (2013.01); *G10H 1/0066* (2013.01); *G10H 2220/116* (2013.01); *G10H 2220/131* (2013.01); *G10H 2240/325* (2013.01)

(58) Field of Classification Search
CPC ............ H04N 21/2187; H04N 21/242; H04N 21/4302; H04H 60/04; H04H 60/02; G10H 1/0058; G10H 1/361; G10H 1/0033; G10H 2240/325; G06F 3/162; G06F 3/0236; G06F 3/16; A63J 5/021; H04L 2012/2849; H04L 67/104
See application file for complete search history.

(56) References Cited

U.S. PATENT DOCUMENTS

| 9,888,296 B2 | 2/2018 | Marck et al. | |
| 2002/0051407 A1* | 5/2002 | Griner | G11B 27/34 369/1 |
| 2003/0236581 A1* | 12/2003 | Chambers | G11B 27/034 700/94 |
| 2013/0070093 A1 | 3/2013 | Rivera et al. | |
| 2014/0137162 A1* | 5/2014 | McNamee | H04N 21/2368 725/63 |
| 2014/0314237 A1* | 10/2014 | Cottrell | H04L 65/4076 381/2 |
| 2015/0221334 A1* | 8/2015 | King | H04S 7/302 700/94 |

(Continued)

*Primary Examiner* — Marlon T Fletcher
(74) *Attorney, Agent, or Firm* — Patent Ingenuity, P.C.; Samuel K. Simpson

(57) ABSTRACT

A computer implemented media synchronization platform has a receiver that receives, from a user-operated computing device located at a live performance, a device media file. Furthermore, the computer implemented media synchronization platform receives, from a soundboard positioned at the live event, a soundboard audio file. The computer implemented media synchronization platform synchronizes, and receives, from the user-operated computing device via a synchronization interface, a realignment of a soundboard audio track. The device media file has a device video track and the device audio track. The soundboard audio file has the soundboard audio track. The computer implemented platform media synchronization platform has a processor that synchronizes the soundboard audio track with the video track, generates dual audio track A/V data based on the synchronization, generates the synchronization interface, and generates a single audio track A/V file based on the realignment. The processor is remotely positioned from the live performance.

13 Claims, 9 Drawing Sheets

(56) References Cited

U.S. PATENT DOCUMENTS

| | | | |
|---|---|---|---|
| 2015/0279424 A1* | 10/2015 | Marck | G11B 27/036 |
| | | | 386/285 |
| 2016/0286282 A1* | 9/2016 | Marck | H04N 21/4415 |
| 2017/0092274 A1* | 3/2017 | Kaufmann | G06F 40/58 |
| 2017/0208112 A1* | 7/2017 | Arrington | H04L 12/10 |
| 2017/0272513 A1* | 9/2017 | Arrington | H04L 67/104 |
| 2019/0081715 A1* | 3/2019 | Arrington | H04H 20/71 |

* cited by examiner

CLOUD-BASED MEDIA SYNCHRONIZATION SYSTEM FOR GENERATING A SYNCHRONIZATION INTERFACE AND PERFORMING MEDIA SYNCHRONIZATION

BACKGROUND

1. Field

This disclosure generally relates to computing systems. More particularly, the disclosure relates to the field of media content recording systems.

2. General Background

With the advent of mobile computing devices (e.g., smartphones, tablet devices, smart wearables, etc.), users are able to perform a number of tasks that previously required being situated in front of a desktop personal computer ("PC"). For example, current configurations allows a user to move from location to location, take pictures or videos at each location, and upload them to a social media website as part of a social media post. In a relatively quiet environment, the user is able to generate a social media post that has adequate audio quality for a viewer of the social media post to be able to discern the user-intended audio.

However, some environments involve significant ambient noise that interferes with the user-intended audio. For example, a user may be situated within a crowd of people, thereby leading to multiple sources of interference for the user-intended audio. Accordingly, current mobile device configurations do not adequately manage ambient noise interference.

SUMMARY

A computer implemented media synchronization platform has a receiver that receives, from a user-operated computing device located at a live performance, a device media file. Furthermore, the computer implemented media synchronization platform receives, from a soundboard positioned at the live performance, a soundboard audio file. The computer implemented media synchronization platform synchronizes, and receives, from the user-operated computing device via a synchronization interface, a realignment of a soundboard audio track. The device media file has a device video track and the device audio track. The soundboard audio file has the soundboard audio track.

Additionally, the computer implemented platform media synchronization platform has a processor that synchronizes the soundboard audio track with the video track, generates dual audio track audio/visual ("A/V") data based on the synchronization, generates the synchronization interface, and generates a single audio track A/V file based on the realignment. The processor is remotely positioned from the live performance. Finally, the computer implemented media synchronization platform has a transmitter that transmits the synchronization interface to the user-operated computing device.

As an alternative, a computer program may have a computer readable storage device with a computer readable program stored thereon that implements the functionality of the aforementioned computer implemented media synchronization platform. As yet another alternative, a process that utilizes a processor may implement the functionality of the aforementioned computer implemented media synchronization platform.

As another alternative, a mobile computing device has a display device. The mobile computing device also has a media capture device that captures media content during a live performance at a live performance environment. Furthermore, the mobile computing device has a processor that generates a device media file during the live performance, renders the synchronization interface on the display device, and generates an audio track realignment based on or more user inputs received via the synchronization interface. The device media file has a device video track and a device audio track.

Furthermore, the mobile computing device has a transmitter that transmits, from the live performance environment to a cloud-based media synchronization platform, the device media file and transmits one or more user inputs inputted at the synchronization interface to the cloud-based media synchronization platform. Finally, the mobile computing device has a receiver that receives, from the cloud-based media synchronization platform, the synchronization interface and receives, from the cloud-based media synchronization platform, dual audio track A/V data based on a synchronization of the device audio track with a soundboard audio track received by the cloud-based media synchronization platform from a soundboard positioned within the live performance environment. The synchronization is performed by the cloud-based media synchronization platform.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

Figure 1:
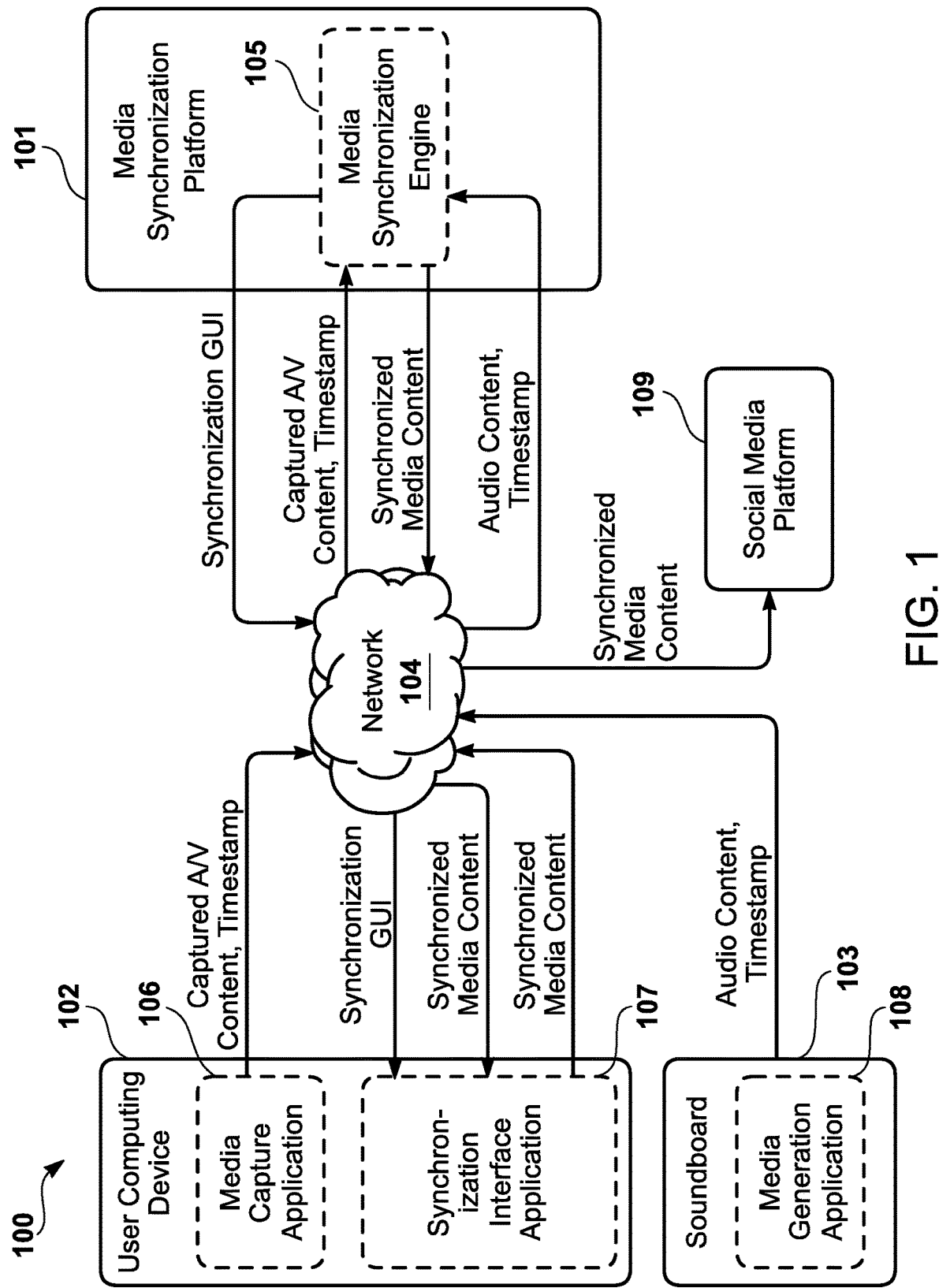
FIG. 1 illustrates a cloud-based media synchronization system, which includes a media synchronization platform that communicates with a user computing device and a soundboard device.

A cloud-based media synchronization system is provided to generate a synchronization interface that may be used on a mobile computing device to synchronize video content, which is captured during a live event with the mobile computing device, with audio content, which is captured during a live event with a soundboard device (e.g., audio mixer). Such synchronization is accomplished by first synchronizing the audio content from the soundboard with the audio content captured by the mobile computing device, given that the mobile computing device audio is the optimal baseline for synchronization since it was captured simultaneously with the video.

Based on user inputs received via the synchronization interface, the cloud-based media synchronization system may perform media synchronization of the soundboard audio with the mobile device audio. Subsequently, the mobile device audio in the original A/V file may be replaced by, or blended with, the soundboard audio, which should then be in substantial synchronization (i.e., synchronization without a human perceivable mismatch) with the video.

As an example of a live performance, a concert will be described with respect to the configurations provided for herein, but the cloud-based media synchronization system may be utilized for other types of live performances or live events. The phrase "live concert" is intended herein to connote that the user is recording the concert as the concert is being performed, and at which the user is physically located.

The cloud-based media synchronization system may be utilized according to two configurations. Firstly, the cloud-based media synchronization system is directed to media synchronization that is performed after a live performance has been completed. The mobile computing device and/or the soundboard device may send their respective content during the live performance or after the live performance has completed, but the could-based media synchronization system waits for completion of the live performance before performing the media synchronization. For example, the cloud-based media synchronization system may wait for the entirety of media files before proceeding to perform synchronization. In other words, this first configuration delays initiation of synchronization until complete media files are received from both the mobile computing device and the soundboard device. As a result, this first configuration avoids bandwidth and/or connectivity issues that may occur during the live performance, thereby leading to transmission interruptions from the mobile computing device and/or the soundboard device to the cloud-based media synchronization system. Such transmission interruptions would ordinarily lead to inefficient use of computing resources (e.g., idle processors, periodic polling communications between a device waiting for data and the device that is supposed to be sending the data, etc.). By way of contrast, the first configuration reduces inefficiencies, such as idle processing time, thereby allowing the one or more processors of the cloud-based media synchronization system to be used for performing other tasks while the live performance is still ongoing.

Secondly, the cloud-based media synchronization system is directed to media synchronization that is performed during the live performance. To accomplish such synchronization without sacrificing computing efficiency, the cloud-based media synchronization system utilizes a buffer data structure within a memory device. Accordingly, as opposed to performing synchronization within real-time (e.g., humanly imperceptible, such as on the order of magnitude of milliseconds) of media content capture and/or generation by the mobile computing device and/or the soundboard device, this second configuration automatically imposes a time delay (e.g., a humanly perceivable time delay, such as ten to fifteen seconds) by storing data within the buffer data structure until the data received from the various devices for a given time period has been received. As a result, the cloud-based media synchronization system avoids unnecessary processor idle times, and may switch to performing other tasks while the buffer data structure is awaiting receipt of data for a given time period.

FIG. 1 illustrates a cloud-based media synchronization system 100, which includes a media synchronization platform 101 that communicates with a user computing device 102 (e.g., smartphone, tablet device, smartwatch, etc.) and a soundboard device 103 (e.g., audio mixer). In one embodiment, the media synchronization platform 101 has a media synchronization engine 105 that may perform a variety of functions. For instance, the media synchronization engine 105 may generate a synchronization graphical user interface ("GUI"), and/or data associated therewith, that it may send, via a network 104, to the user computing device 102. For example, a user operating the user computing device 102 may download a synchronization software application 107, which may have the GUI integrated therein, to his or her smartphone.

The user computing device 102 itself may have a media capture application that may be used to perform various forms of media capture 106 (e.g., image capture, video capture, audio capture, etc.) in the form of an A/V file. For instance, the user computing device 102 may have various hardware components (e.g., camera, microphone, etc.) that physically capture media for the media capture application 106 to generate in an A/V file. For example, a user may want to generate an A/V file, which includes both video and audio from a live concert. Although, the video is captured from the particular perspective and points of interest determined by the user, the audio captured by the user computing device 102 may be subject to significant ambient noise (e.g., noise from the surrounding crowd), diminution in audio quality resulting from too much distance from the source of the audio (e.g., a seat position that is too far from the performance to obtain quality audio), and/or distortion in audio resulting from the inability, or only partial ability, of the audio reception device (e.g., microphone) in the user computing device 102 to receive audio exceeding a particular decibel level, such as the audio at a concert. Accordingly, the user may utilize the synchronization GUI to send the captured A/V file, or portions thereof, to the media synchronization platform 101 via the synchronization interface application 107 through the network 104. Thus, the media synchronization platform 101 may modify or replace the audio portion, without modification to the video portion, of the A/V file to improve the quality of the audio in the A/V file. As a result, the particular artistic emphasis utilized by the user when capturing the video may be maintained, while the audio may be enhanced.

To accomplish the foregoing audio enhancement, the media synchronization platform 101 may receive a higher quality audio file, which was captured and/or generated at the same live concert, from a soundboard device 103. For example, one or more audio reception devices (e.g., microphones) may capture audio emitted from a variety of audio sources (vocalist, instrumentalist, etc.) at the live concert. An acoustic engineer physically positioned at the concert, and operating the soundboard 103, may adjust the relative acoustic levels of the various audio received by the soundboard 103 to emphasize one particular audio source over another at a given time during the live performance. Furthermore, the soundboard device 103 may generate a digital audio file, via a media generation application 108, based on the adjustments performed by the acoustic engineer. Presumably, this digital audio file, which is based on adjustments to audio obtained from optimally placed audio reception devices, will be of a significantly better quality (i.e., less ambient noise) than the audio captured by the user computing device 102.

Therefore, the media synchronization platform 101 receives the A/V file from the user computing device 102 and the soundboard audio file from the soundboard 103 to modify the audio of the A/V file based on the audio in the soundboard audio file, without modifying the integrity of the video captured by the user. In one embodiment, the synchronization interface application 107 of the user computing device 102 sends a timestamp associated with the time at which the audio in the A/V file was captured, and the media generation application 108 sends a timestamp associated with the time at which the audio in the soundboard audio file was captured. The media synchronization engine 105 may receive the timestamps, from the user computing device 101 and the soundboard 103, which provide a starting point for aligning the audio captured in the soundboard audio file with the audio captured in the A/V file. Ultimately, the media synchronization engine 105 attempts to use the audio captured in the A/V file as the basis for synchronization because that audio was captured along with the video, which remains unmodified. (In other embodiments, enhancements to the video (e.g., lighting changes, cropping, etc.) may be additionally performed.) The media synchronization engine 105 may then perform cross-correlation to fine tune the initial alignment. For example, the timestamps may not be granular enough (e.g., based on seconds), whereas the media synchronization platform 101 may attempt to correlate the audio data from the two different devices on a more granular level (e.g., milliseconds). Accordingly, after establishing an initial starting point for comparison, the media synchronization platform 101 may perform an audio analysis that compares the audio from the user computing device 102 with the audio from the soundboard 103 to better align the audio tracks for eventual replacement, or modification, of the audio received from the user computing device 102 with the audio received from the soundboard 103. In another embodiment, the media synchronization engine 105 may perform the audio analysis without receiving timestamps for determination of a starting point for the cross-correlation.

Although the user computing device 102 and the soundboard 103 are physically positioned at the live event, the media synchronization platform 101 is remotely positioned from the live event. Accordingly, the user computing device 102 and the soundboard device 103 do not directly communicate with each other with respect to the synchronization of the media files, but rather rely on a cloud-based solution in the form of the media synchronization platform 101.

Upon media synchronization, the media synchronization platform 101 generates a new, or modified, A/V file. Furthermore, the media synchronization platform 101 sends that A/V file to the user computing device 102 so that the user may upload it, via the network 104, to a social media platform 109.

Figure 2A:
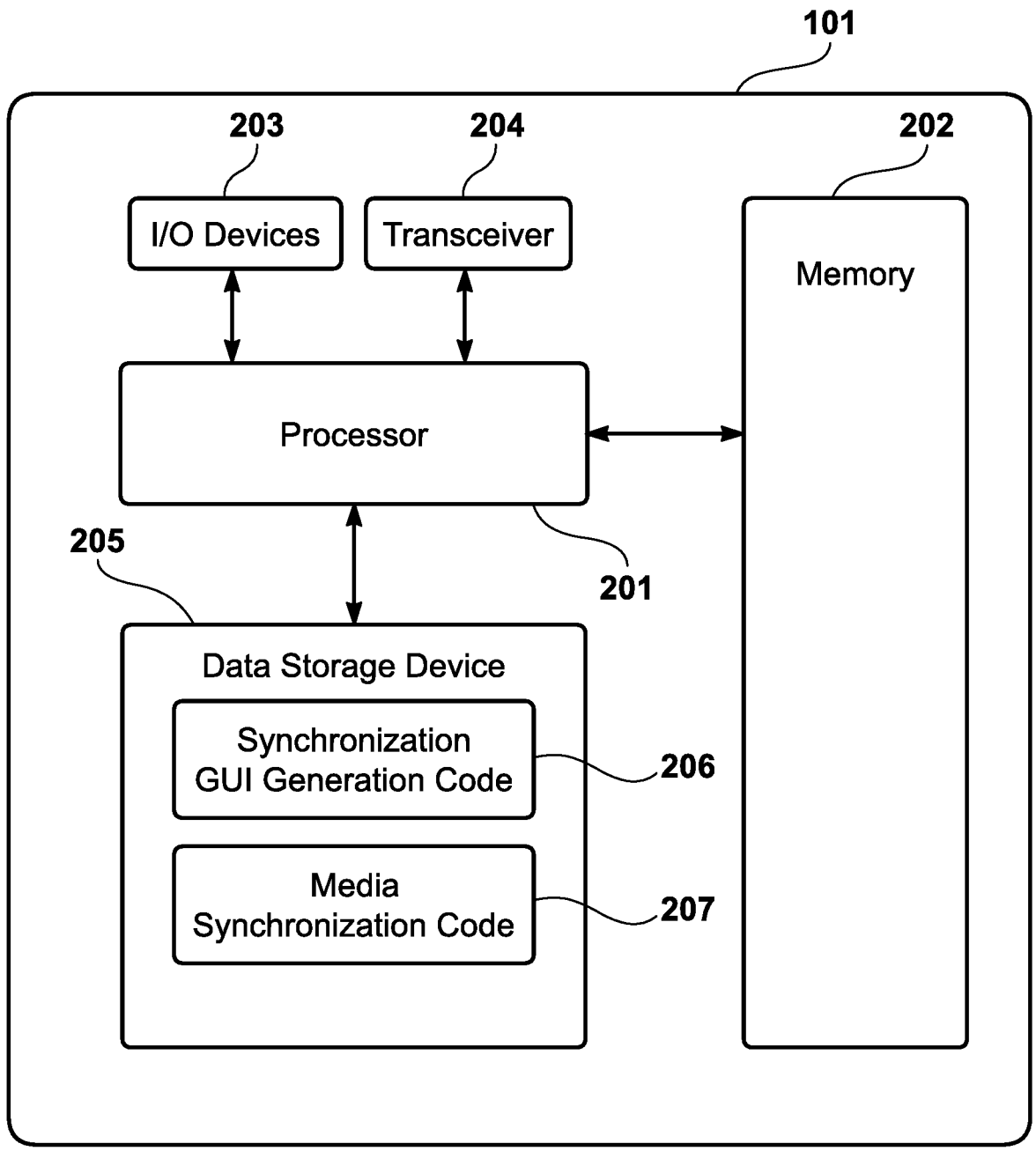
FIG. 2A illustrates the internal components of the media synchronization platform 101 illustrated in FIG. 1.
Figure 2B:
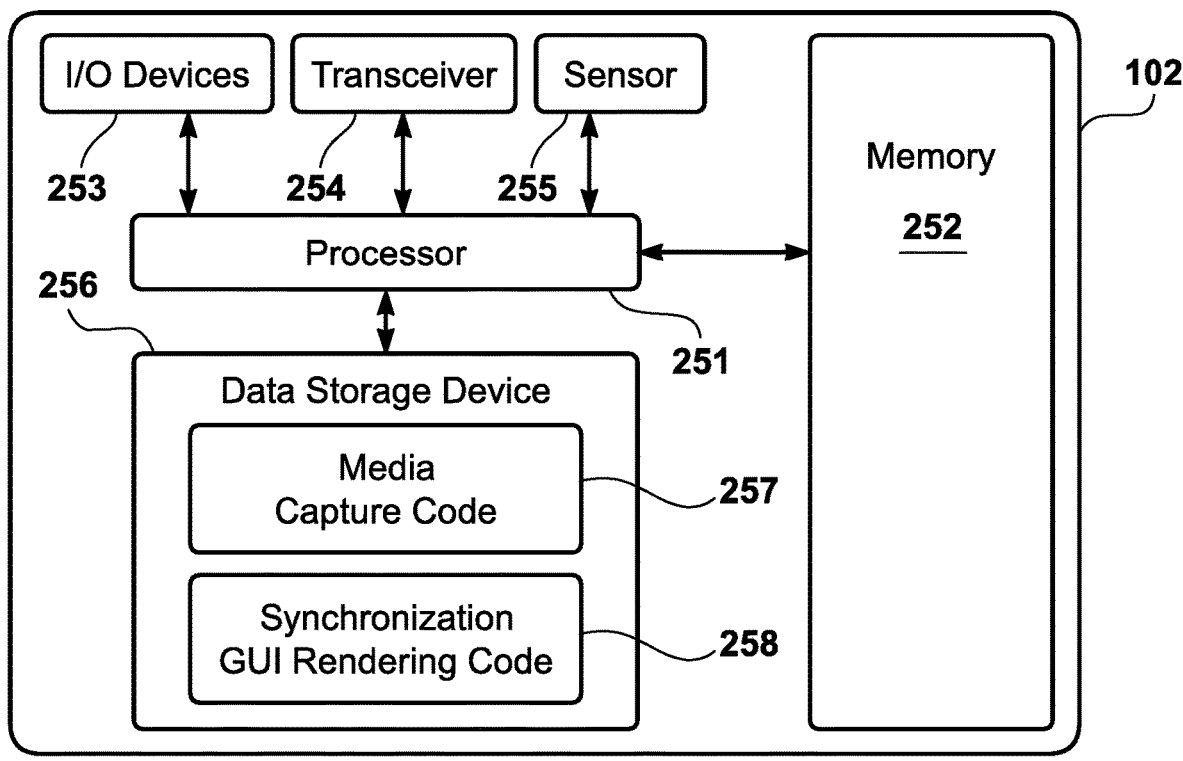
FIG. 2B illustrates the internal components of the user computing device illustrated in FIG. 1.
Figure 2C:
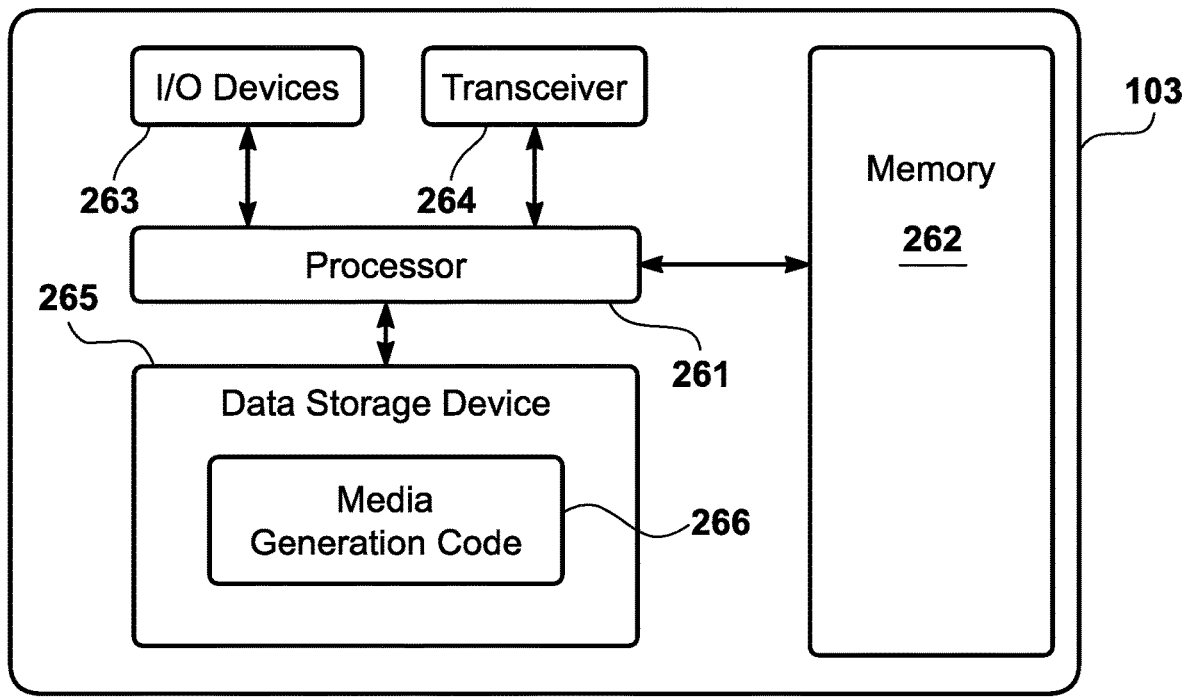
FIG. 2C illustrates the internal components of the soundboard illustrated in FIG. 1.

FIGS. 2A-2C illustrate internal componentry for the apparatuses illustrated in FIG. 1. For example, FIG. 2A illustrates the internal components of the media synchronization platform 101 illustrated in FIG. 1. In particular, a processor 201, which may be specialized for generating GUIs and/or performing media synchronization may be used to perform the operations illustrated in FIG. 1 for generating a synchronization GUI, to be downloaded by the user computing device 102, and synchronizing the audio captured by the soundboard 103 with the audio captured by the computing device 102. For example, the processor 201 may be capable of generating the interactive graphical components of the GUI and bringing together those interactive graphical components in a manner that improves usage of the mobile computing device 102. Instead of the mobile computing device 102 solely being used to perform media capture, the processor 201 allows the mobile computing device 102 to participate in fine tuning the media synchronization via visual graphical features, thereby improving the usability of the mobile computing device 102 for media synchronization.

The media synchronization platform 101 may also include a memory device 202, which may temporarily store computer readable instructions performed by the processor 201. As an example of such computer readable instructions, a data storage device 205 within the media synchronization platform 101 may store synchronization GUI generation code 206 and media synchronization code 207. The processor 201 may execute the synchronization GUI generation code 206 to generate the synchronization GUI rendered by the synchronization interface application 107 executed by the user computing device 102 illustrated in FIG. 1. Furthermore, the processor 201 may execute the media synchronization code 207 to perform media synchronization of the audio received from the soundboard 103 with the audio received from the user computing device 102.

Furthermore, the media synchronization platform 101 have one or more input/output ("I/O") devices 202 that may receive inputs and provide outputs. Various devices (e.g., keyboard, microphone, mouse, pointing device, hand controller, etc.) may be used for the I/O devices 203. The media synchronization platform 101 may also have a transceiver 204 to send and receive data. Alternatively, a separate transmitter and receiver may be used instead.

Further, FIG. 2B illustrates the internal components of the user computing device 102 illustrated in FIG. 1. In particular, a processor 251, which may be specialized for rendering GUIs may be used to render the synchronization GUI obtained from the media synchronization platform 101. For example, the processor 251 may be capable of rendering the interactive graphical components of the synchronization GUI and bringing together those interactive graphical components in a manner that improves usage of the mobile computing device 102.

Moreover, the user computing device 102 may include one or more sensors 255 that are specifically configured to sense data particular to the live event environment in which the user is situated. For example, the sensor 255 may be a geolocation-based sensor (e.g., global positioning system ("GPS")) that determines the location (e.g., seat position) of the user with respect to the live event. By determining the distance of the user with respect to the audio source (stage at which the vocalist, instrumentalist, etc. are positioned), the user computing device 102 and/or the media synchronization platform 101 are able to adjust the quality of the audio from the soundboard 103 to correspond to the position of the user. For example, a user that has a front row seat at a concert, corresponding to front row captured video, may have audio that is quite loud as adjusted by the media synchronization platform 101 to correspond to such seat positioning, whereas a different user that has a much farther seat at the concert, corresponding to farther away captured video, may have audio that is not as loud as adjusted by the media synchronization platform 101 to correspond to such seat positioning.

Also, the user computing device 102 may also include a memory device 252, which may temporarily store computer readable instructions performed by the processor 251. As an example of such computer readable instructions, a data storage device 256 within the user computing device 102 may store media capture code 257 and synchronization GUI rendering code 258. The processor 251 may execute the media capture code 257 to perform media capture at the live performance. Furthermore, the processor 251 may execute the synchronization GUI rendering code 258 to render the synchronization GUI at the user computing device 201 to receive one or more user inputs from the user.

Additionally, FIG. 2C illustrates the internal components of the soundboard illustrated in FIG. 1. In particular, a processor 261, which may be specialized for acoustic adjustment may be used to perform acoustic adjustments to audio data received via one or more I/O devices (e.g., microphones) 263 positioned within proximity to the audio sources at the live performance.

Also, the soundboard 103 may also include a memory device 262, which may temporarily store computer readable instructions performed by the processor 261. As an example of such computer readable instructions, a data storage device 265 within the soundboard 103 may store media generation code 266. The processor 261 may execute the media capture code 266 to perform media generation at the live performance.

Figure 3:
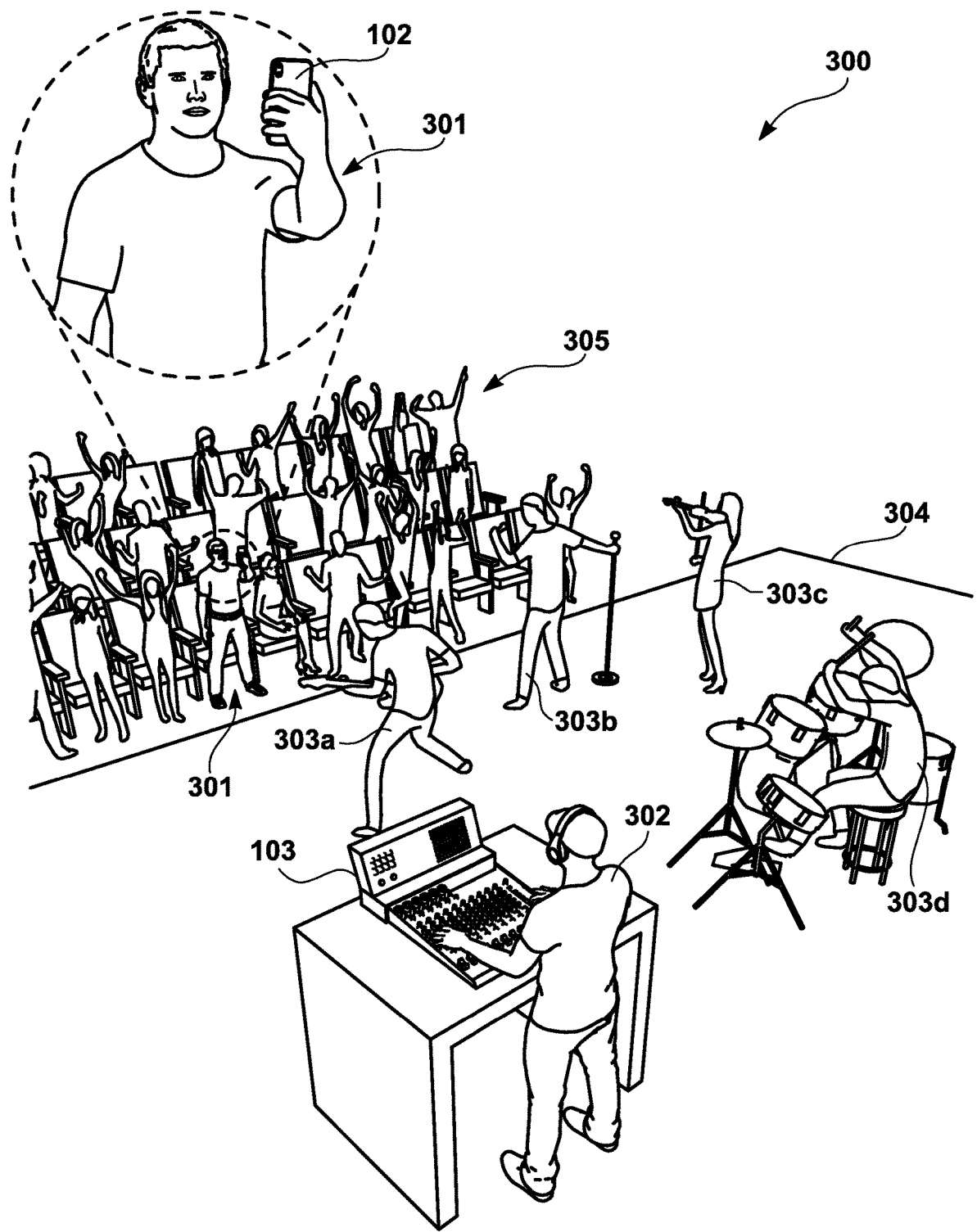
FIG. 3 illustrates an example of a live performance environment, such as a concert environment, at which audio may be captured for synchronization by the media synchronization platform illustrated in FIG. 1.

FIG. 3 illustrates an example of a live performance environment 300, such as a concert environment (e.g., theater), at which audio may be captured for synchronization by the media synchronization platform 101 illustrated in FIG. 1. In particular, the live performance environment 300 may have a stage 304 at which a plurality of performers 303a-e are situated. Furthermore, an acoustic engineer 302 and the soundboard 103 may be in close proximity to the stage 304. During the concert, an audience 305 may view the concert. Further, as an example, the audience member 301 may be operating the user computing device 102 during the concert to capture video and audio of the performance. As a result, the user computing device 102 may be automatically configured, or configured upon a user input, and the soundboard 103 may be automatically configured, or configured upon a user input, to each independently transmit their respective captured media content to the media synchronization platform 101, illustrated in FIG. 1. (Although only one audience member 301 is illustrated as using the user computing device 102 to perform video and audio capture during the live performance, more than one member of the audience 305 may also be using a user computing device 102 to simultaneously capture video and audio of the performance, each from a different user perspective based on location of the user and positioning of the respective user computing device 102.)

Figure 4A:
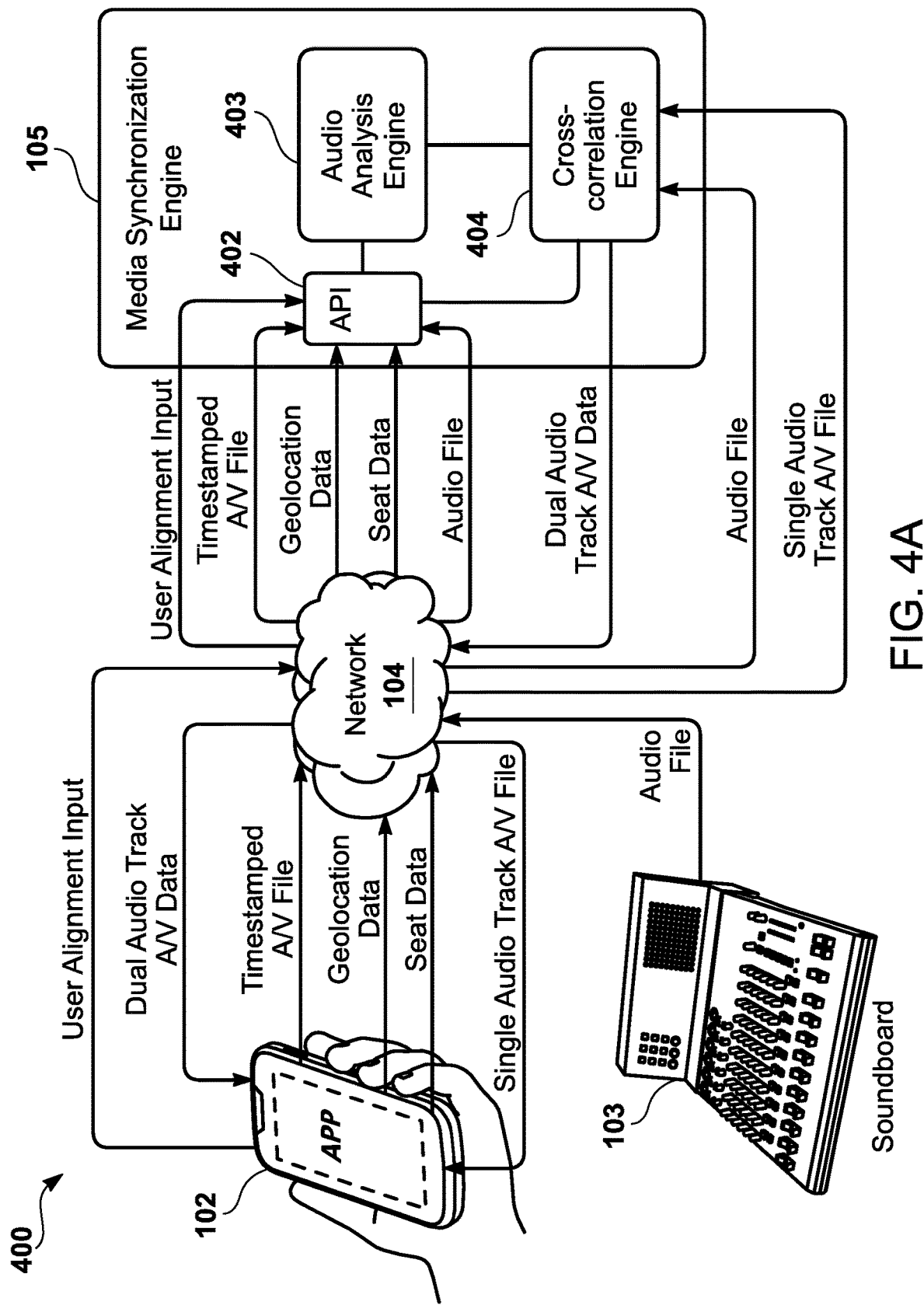
FIG. 4A illustrates a post-performance synchronization system, which effectuates synchronization at a time after completion of the performance.
Figure 4B:
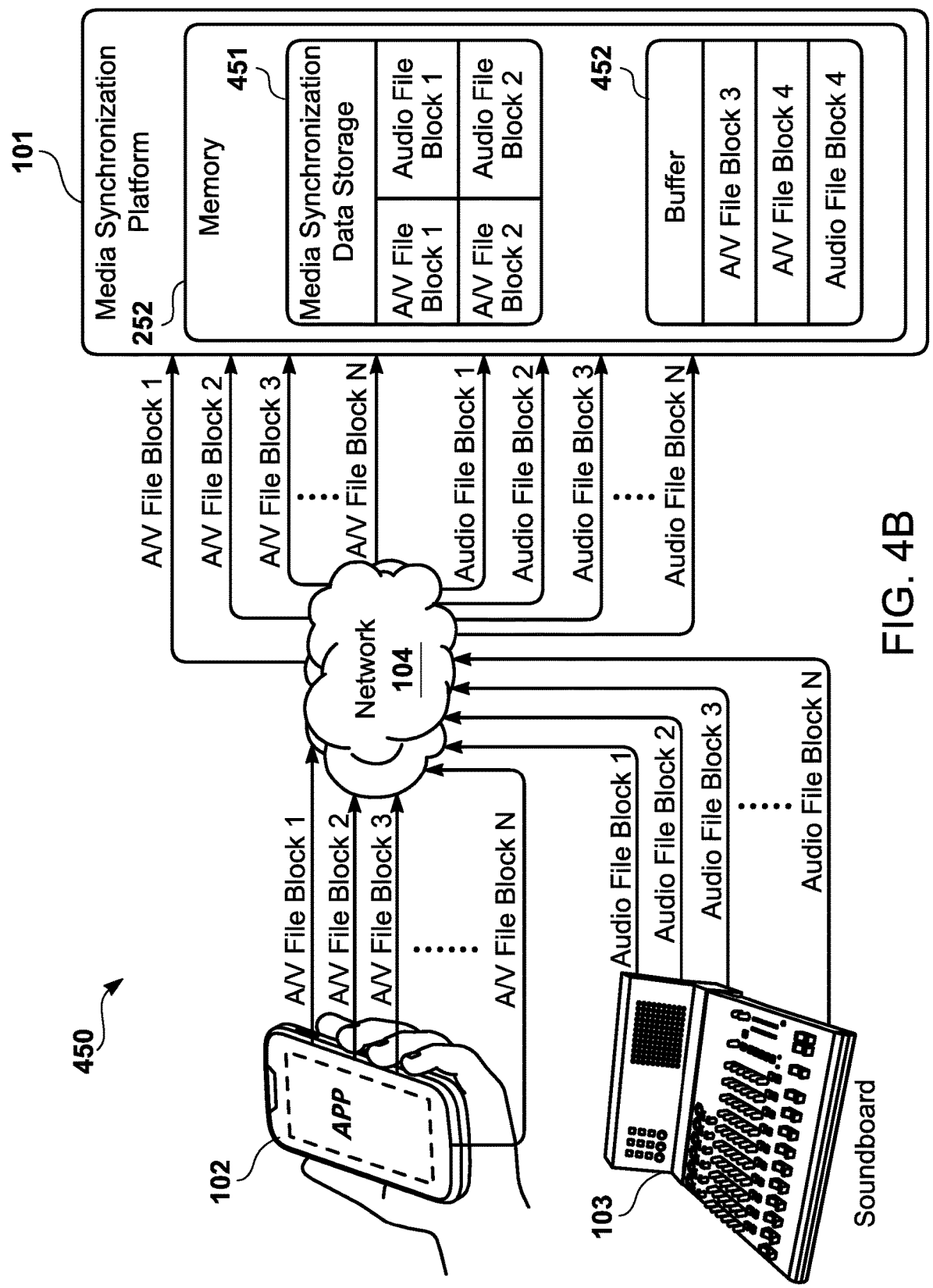
FIG. 4B illustrates a buffered synchronization system that allows for media synchronization to be performed by the media synchronization engine.

FIGS. 4A and 4B illustrate various system configurations for the media synchronization system 100 illustrated in FIG. 1, based on the manner in which the media content is sent to the media synchronization engine 105 from the user computing device 102 and the soundboard 103. In particular, FIG. 4A illustrates a post-performance synchronization system 400, which effectuates synchronization at a time after completion of the live performance. For example, the media synchronization engine 105 may mandate, through its API 402, that synchronization will not be permitted until the completion of the live performance. For example, in one embodiment, the media synchronization engine 105 may necessitate that both the user computing device 102 and the soundboard device 103 make a function call, via the API 402, which toggles a performance completion flag to "on" before the media synchronization engine 105 will process the data received from the user computing device 102 and/or the soundboard 103. For instance, the media synchronization engine 105 may generate an error message to send to the user computing device 102 and/or the soundboard 103 upon transmission of data without the performance completion flag being toggled to "on." (The performance completion flag is just one example of a completion indicium, which may take the form of various other types of indicators that connote performance completion.) In another embodiment, the synchronization interface application 107 may be configured on the user computing device 102, and/or the media generation application 108 may be configured on the soundboard 103, to send media content to the media synchronization engine 105 only upon completion of the live performance. In yet another embodiment, the media synchronization engine 105 may independently monitor completion of the live performance (e.g., via one or more sensors, positioned at the live performance to provide remote communication to the media synchronization engine 105, that measure decibel levels being lower than a predetermined audio threshold for a predetermined amount of time.) A variety of approaches may be utilized to determine completion of the live event so that the post-performance synchronization system 400 may permit the media synchronization engine 105 to process entire media files, rather than streamed media files during the live performance.

Upon completion of the live performance, the user computing device 102 may send an A/V file, generated from captured video and audio data by the user 301 during the live performance, along with a user device timestamp of when the A/V file was generated by the user computing device 102. In one embodiment, the user device timestamp is generated by the synchronization interface application 107 to provide consistency of timestamp generation amongst user computing devices 102. Rather than relying on different device native applications, which may generate timestamps according to slightly different clock mechanisms, the synchronization interface application 107 avoids having to reconcile timestamp generation discrepancies amongst multiple devices, thereby improving computing performance by reducing use of computing resources in generating timestamps and resolving timestamp discrepancies. In an alternative embodiment, the user device timestamp is generated by the native application of the user computing device 102. Optionally, additional data such as geolocation data (e.g., GPS data determined by the sensor 255 of the user computing device 102) and/or seat position data (e.g., ticket data retrieved from a user profile database) may also be sent by the user computing device 102 to the media synchronization engine 105, via the API 402. Moreover, upon completion of the live performance, the soundboard 103 may send the audio file generated during the live performance to the media synchronization engine 105 with a soundboard timestamp of when the audio file was generated by the soundboard 103. As a result, the media synchronization engine 105 receives two entire media files, one A/V file from the user computing device 102 and one audio file from the soundboard 103, along with corresponding timestamps. However, the timestamps may only be the initial starting point for synchronizing the media files. For example, the soundboard 103 may have begun generating its media file at three o'clock when the concert began, but the user computing device 102 may have begun generating its media file at four o'clock when the user wanted to start recording the live performance of a particular performer. Accordingly, the media synchronization engine 105 also has an audio analysis engine 403 that uses the timestamps as a starting point to avoid expending computing resources analyzing audio data outside of the time window presented by the timestamps (e.g., in the example above, the audio analysis may be begin at four o'clock, rather than at three o'clock). The audio analysis engine 403 then compares the audio from the A/V file, generated by the user computing device 102, with the audio from the audio file, generated by the soundboard 103. For example, on an audio frame by audio frame basis, the audio analysis engine 403 may compare each audio frame of the A/V file with the audio of the audio file to determine which audio frames best match each other. In one embodiment, a probabilistic analysis is performed by assigning a probability of an audio frame match, and selecting the audio frame of the audio file that has the highest probability of matching the audio frame of the A/V file. Furthermore, a cross-correlation engine 404 may attempt to align the audio frames of the audio file with the audio frames of the A/V file. For example, the cross-correlation engine 404 may determine that a significant quantity (e.g., within a predetermined quantity) of neighboring audio frames of the audio file have a high probability (e.g., exceeding a predetermined probabilistic threshold) of being matches with audio frames of the A/V file, thereby resulting in a particular confidence score indicative of a significant likelihood of a match. Accordingly, the cross-correlation engine 404 may align the audio frames from the audio file with the audio frames from the A/V file. In one embodiment, the audio analysis engine 403 and/or the cross-correlation engine 404 may be implemented via an artificial intelligence ("AI") system to generate recommendations. For example, the AI system may be used to recommend the initial starting point for the cross-correlation.

In one embodiment, the cross-correlation engine 404 generates dual audio track A/V data based on the alignment. In essence, the dual audio track A/V data has the video from the original A/V file recorded by the user with the user computing device 102, a first audio track corresponding to the audio from the original A/V file recorded by the user 301, and a second audio track generated by the audio from the audio filed generated by the acoustic engineer at the soundboard 103. Additionally, the dual audio track A/V data has alignment data indicating the alignment of the first audio track and the second audio track, as determined by the cross-correlation engine 404.

Upon receiving the dual audio track A/V data, the user computing device 102 may render the synchronization interface based on the dual audio track A/V data. In particular, the synchronization interface may display the video, both of the audio tracks, and alignment of those audio tracks. From a practical perspective, the cross-correlation engine 404 may generate the alignment of the audio tracks based on a relatively high degree of confidence, but only to a certain degree because the audio tracks may differ in many respects. For example, the ambient noise (cheering, laughing, clapping, booing, grunting, etc.) resulting audio track in the A/V file may make an automatic alignment infeasible. Ultimately, the automatic alignment may allow for a cross-correlation that is quite close where it should be, but that necessitates additional fine tuning from the user who recorded the audio from the original A/V file during the ambient noise; thus, the user may be able to comprehend certain audio captured during the ambient noise. The synchronization interface may have interactive features that allow the user to provide one or more interactive inputs through the synchronization interface to modify the alignment generated by the cross-correlation engine 404. Accordingly, the user 301 may use the synchronization interface to provide those interactive inputs to the media synchronization engine 105. As a result of receiving the interactive inputs from the user 301, the media synchronization engine 105 may adjust the alignment and generate a single audio track A/V file that replaces the audio of the original A/V file with the audio of the soundboard-generated audio file. Since at that point the audio of the soundboard-generated audio file will be aligned with the original audio, which was aligned with the originally captured video, the audio of the soundboard-generated audio file should now also be aligned with the video. The media synchronization engine 105 may then send the single audio track A/V file to the user computing device 102 for rendering by the user computing device 102 and/or posting to the social media platform 109, illustrated in FIG. 1. In one embodiment, the social media platform 109 is distinct, and remotely situated, from the media synchronization platform 101. In another embodiment, the social media platform 109 is the media synchronization platform 101. In other words, users may use the same synchronization interface to both capture media content and post to social media within the same platform.

Although dual audio track A/V data is discussed with respect to FIG. 4A, in an alternative embodiment, the media synchronization engine 105 may generate the single audio track A/V file without generating the dual audio track A/V data. For example, the cross-correlation engine 404, with or without implementation of an AI system, may replace the audio track of the original A/V file with the audio track of the soundboard-generated audio file without requesting input from the user for fine-tuning via the synchronization user interface. In another embodiment, the media synchronization engine 105 may or may not generate dual audio track A/V data, depending on the confidence score of the cross-correlation performed by the cross-correlation engine 404. For example, if the cross-correlation engine 404 determines that the alignment it generated exceeds a predetermined confidence score, the cross-correlation engine 404 may forego generating the dual audio track A/V data, and rely on the alignment it generated. Conversely, if the cross-correlation engine 404 determines that the alignment it generated does not exceed the predetermined confidence score, the cross correlation engine 404 may generate the dual audio track A/V data to obtain input from the user for fine tuning the alignment.

Additionally, the audio analysis engine 403 may utilize external information in performing the audio analysis. For instance, based on the physical location of the user computing device 102 relative to the performance stage 304 (e.g., determined by GPS data, seat information, etc.), the audio analysis engine 403 may determine that certain audio is within an acceptable range of ambient noise, while other audio is not. For example, the audio analysis engine 403 may be less likely to categorize audio generated as ambient noise when the user is within ten feet of the performance stage 304, but more likely to categorize audio as ambient noise when the user is one hundred feet away from the performance stage 304. Accordingly, the audio analysis engine 403 may be configured to alter its analysis based upon the relative positioning of the user computing device 102.

In contrast with the post-performance synchronization system 400 illustrated in FIG. 4A, a buffered synchronization system 450, illustrated in FIG. 4B, allows for media synchronization to be performed by the media synchronization engine 105. In particular, the user computing device 102 and the soundboard 103 may stream data blocks to the media synchronization engine 105 during the live performance, rather than waiting for the completion of the live performance. For example, the user computing device 102 may send a series of A/V data blocks, via the network 104, to the media synchronization engine 105 at various times throughout at least a portion of the live performance. Furthermore, the soundboard 103 may send the audio file via a series of data blocks, via the network 104, to the media synchronization engine 105 at various times throughout at least a portion of the live performance. Timestamps may be sent with each of the data blocks from each of the foregoing apparatuses. Yet, performing immediate cross-correlation 404 is not feasible for the media synchronization engine 105 because the user computing device 102 may send some data blocks at different times than the soundboard 103. For example, the user computing device 102 may experience connectivity problems at a given time during the live performance, whereas the soundboard may not have such connectivity problems. To avoid idle processing time, the media synchronization platform 101 may generate a buffer data structure 452 for temporary storage of data blocks within the memory device 202. For example, the media synchronization engine 101 may temporarily store incoming data received from one apparatus, such as the soundboard 103, until a predetermined amount of data is also received from another apparatus, such as the user computing device 102. Upon receiving the predetermined amount of data from both apparatuses, the media synchronization engine 105 may invoke the processor 201, illustrated in FIG. 2A, to perform synchronization on the data blocks stored in the buffer data structure 452, store the synchronized data blocks in a media synchronization data structure 451, and free up remaining space in the buffer data structure 452 for additional entries in the buffer data structure 452. For example, the buffering data in the buffer data structure 452 may result in a human perceivable delay (e.g., ten to fifteen seconds from the audio being heard at the live performance). In one embodiment, the media synchronization structure 451 is a multi-dimensional array, wherein each row corresponds to a block of a particular size, and each column corresponds to a portion of the A/V file of that block size and a portion of the audio file of that block size. Alternatively, other data structures (e.g., one-dimensional arrays, linked lists, etc.) may be utilized instead. Accordingly, the buffer data structure 452 allows the media synchronization engine 105 to alleviate idle processing time while waiting for both of the apparatuses to send data, thereby improving the computing performance of the processor 201.

In yet another embodiment, the media synchronization platform 101 automatically selects between the post-performance synchronization system 400 illustrated in FIG. 4A and the buffered synchronization system 450 illustrated in FIG. 4B. For example, during first communication with the media synchronization platform 101 during the live performance, the user computing device 102 and the soundboard 103 provide various communication indicia (e.g., connectivity to the network 104, bandwidth, etc.) to determine the viability of utilizing the buffered synchronization system 450. If the media synchronization platform 101 determines that performing media synchronization during the live performance is viable, the media synchronization platform 101 may opt to utilize the buffered synchronization system 450. Conversely, if the media synchronization platform 101 determines that performing media synchronization during the live performance is not viable, the media synchronization platform 101 may opt to utilize the post-performance synchronization system 400.

Figure 5A:
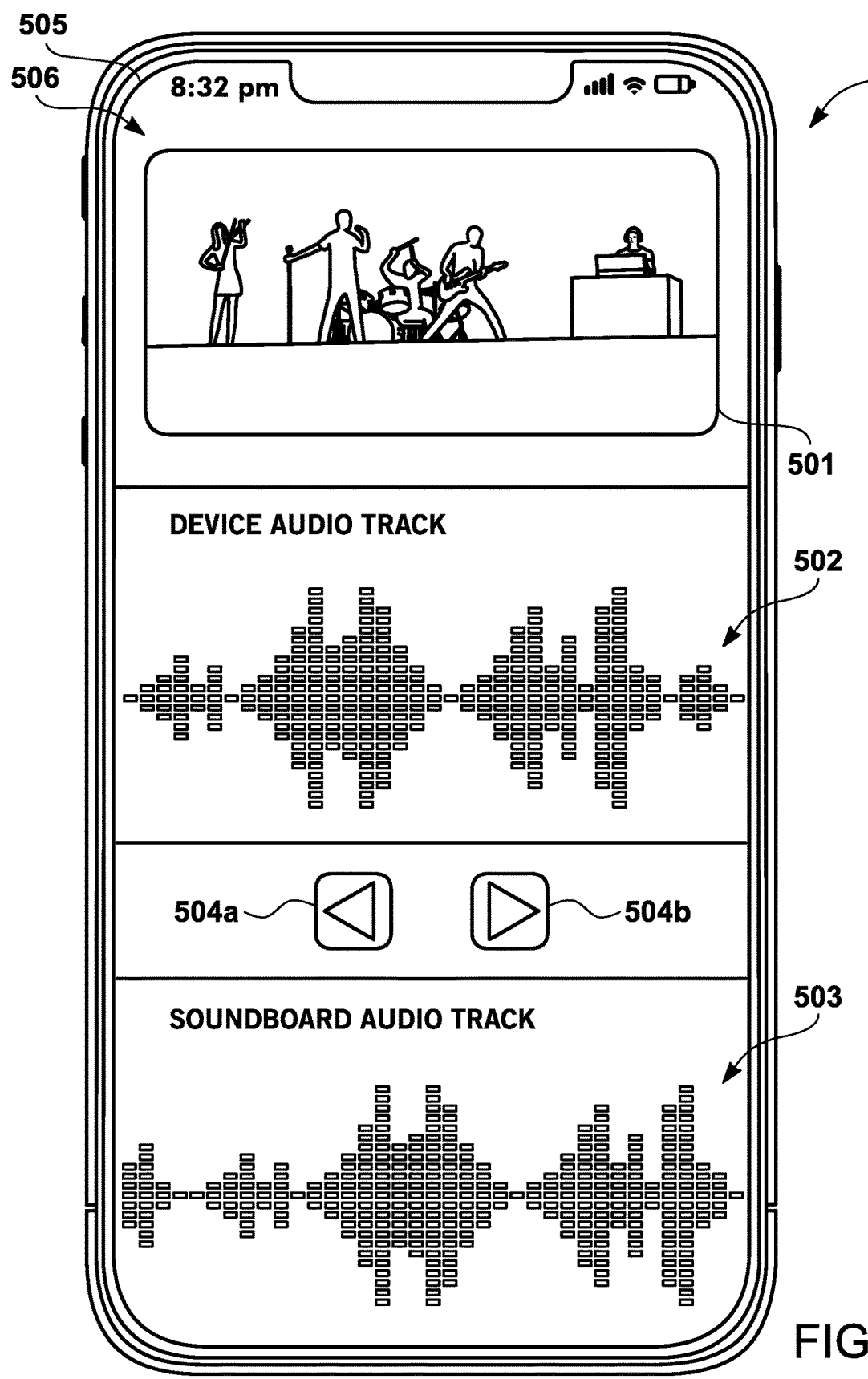
FIG. 5A illustrates an example of the user computing device rendering the synchronization interface with interactive elements to modify the alignment of the audio tracks.
Figure 5B:
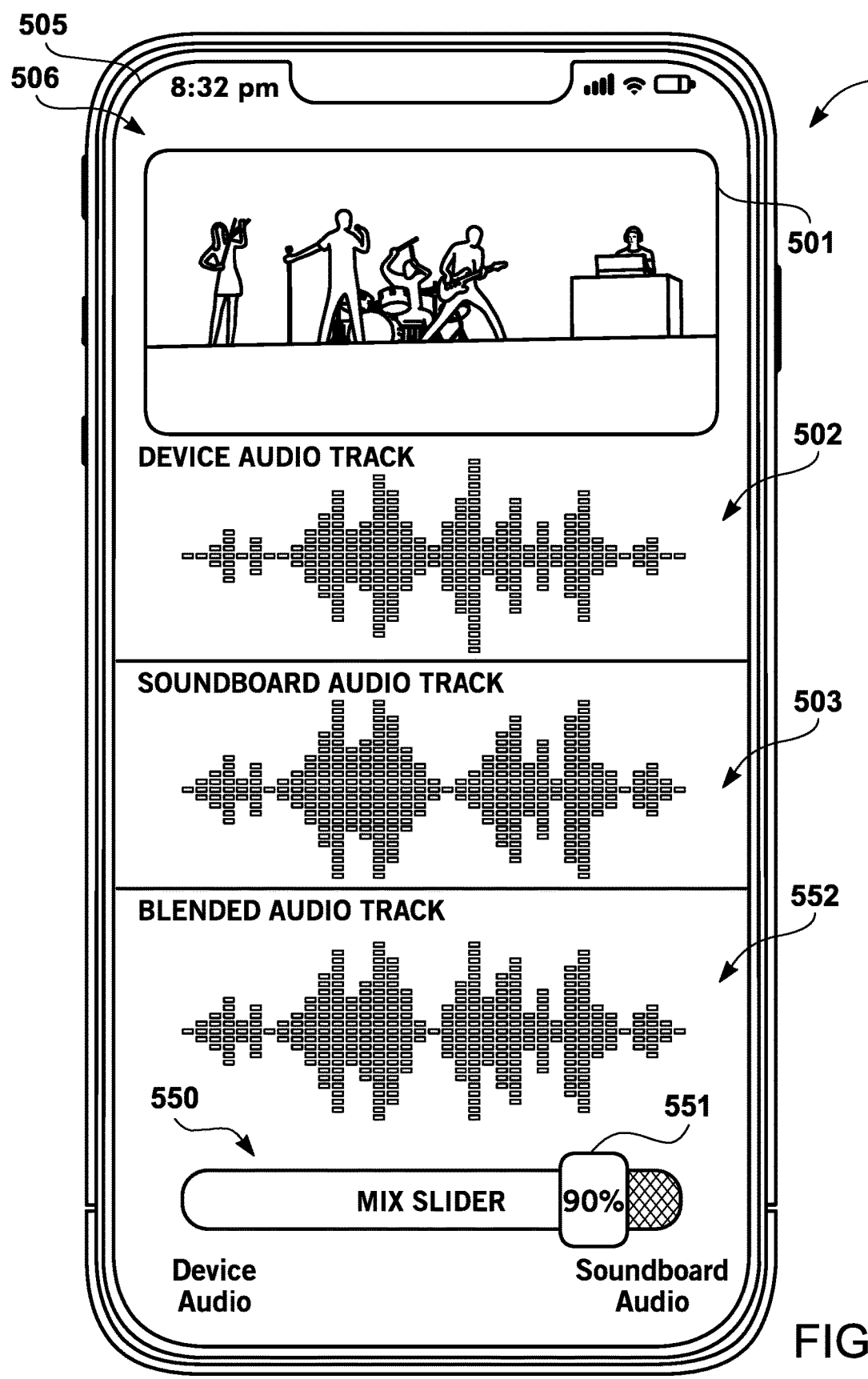
FIG. 5B illustrates an example of the user computing device rendering the synchronization interface with interactive elements to blend the audio tracks.

FIGS. 5A and 5B illustrates various examples of a synchronization interface 506 that may be displayed by the user computing device 103 to present interactive graphical features for the user 301 to fine tune the cross-correlation generated by the cross-correlation engine 404 illustrated in FIG. 4A. In particular, FIG. 5A illustrates an example of the user computing device 102 rendering the synchronization interface 506 with interactive elements to modify the alignment of the audio tracks. As discussed with respect to FIG. 4A, the media synchronization engine 105 may generate dual audio track A/V data that may be sent to the user computing device 102 for fine tuning of the alignment via one or more user inputs at the user computing device 102. Accordingly, the synchronization interface 506 displays, on a display screen 505 of the user computing device 102, a video track 501, a user device generated audio track 502, a soundboard generated audio track 503, and visual alignment indicia 504a and 504b (e.g., left and right arrows) for adjusting the alignment the audio tracks. For example, when the user provides a user input (touch-based, gestured-based, voice-based, etc.) to adjust the soundboard audio track 503, the soundboard audio track 503 may visually move left or right to line up with the alignment indicated by the user. (Alternatively, the device audio track 502 may move left or right.) As another example, a vertical line may be visually displayed over the two audio tracks 502 and 503 for ease of reference for the user. (Other types of visual indicia, directional movements of the audio tracks 502 and 503 (e.g., up/down as opposed to left/right) may be utilized instead since the features illustrated in FIG. 5A are provided only as examples.)

Also, FIG. 5B illustrates an example of the user computing device 102 rendering the synchronization interface 506 with interactive elements to blend the audio tracks 502 and 503. In other words, rather than replace the device-generated audio track 502 with the soundboard-generated audio track 503, the media synchronization platform 101, illustrated in FIG. 1, may blend the two audio tracks 502 and 503. For example, the user may want to include some ambient noise within a social media post to provide friends with a feel of what the user experienced from his or her perspective during the live performance. Accordingly, the synchronization interface 506 may have a blending slider 550 that allows the user to provide a blending input via a blending indicium 551 of what portion (e.g., percentage) of the resulting audio track should be based on the device-generated audio track 502 and what portion of the resulting audio track should be based on the soundboard-generated audio track 503. In other words, the blending slider 550 may be adjusted to indicate a blending ratio, as displayed by the blending indicium 551. Upon receiving the blending user input, the user computing device 102 may send the blended audio track to the media synchronization platform 105 to generate the single audio track file based on blending, rather than replacement. (Other forms of visual graphical or audio feature may be used by the synchronization interface other than the blending slider 550.) In one embodiment, the synchronization interface may display a blended audio track 552.

Although the configurations provided for herein have been described based on the media synchronization being solely performed by the remotely situated media synchronization platform 101, the user computing device 102 is also capable of performing portions of the media synchronization, or entire tasks. For example, the user computing device 102 may be configured to perform blending of the audio tracks 502 and 503.

The synchronization interface 506 is not limited to one or the other of the interactive visual features illustrated in FIGS. 5A and 5B. For example, both the blending indicium 551 and the visual alignment indicia 504a and 504b may be used in the same synchronization interface to provide for both realignment and blending of the audio tracks 502 and 503.

Further, the media synchronization platform 101 is not limited to a single-user environment. For instance, the media synchronization platform 101 may be used in a multi-user environment to generate a multi-user A/V file that may be consumed via the social media platform 109 illustrated in FIG. 1. As an example, the media synchronization platform 101 may receive a continuous series of data blocks corresponding to the audio generated by the soundboard 103 during the live performance, but may receive different user broadcasts corresponding to various portions of the live performance (e.g., different users may capture different songs throughout a concert rather than the entire concert). Accordingly, the media synchronization platform 101 may switch between different audio tracks received from various user computing devices 102 throughout the live performance to generate as cohesive, or almost cohesive (depending on user device audio track availability), A/V file with higher quality audio based on the audio track generated by the soundboard 103.

Figure 6:
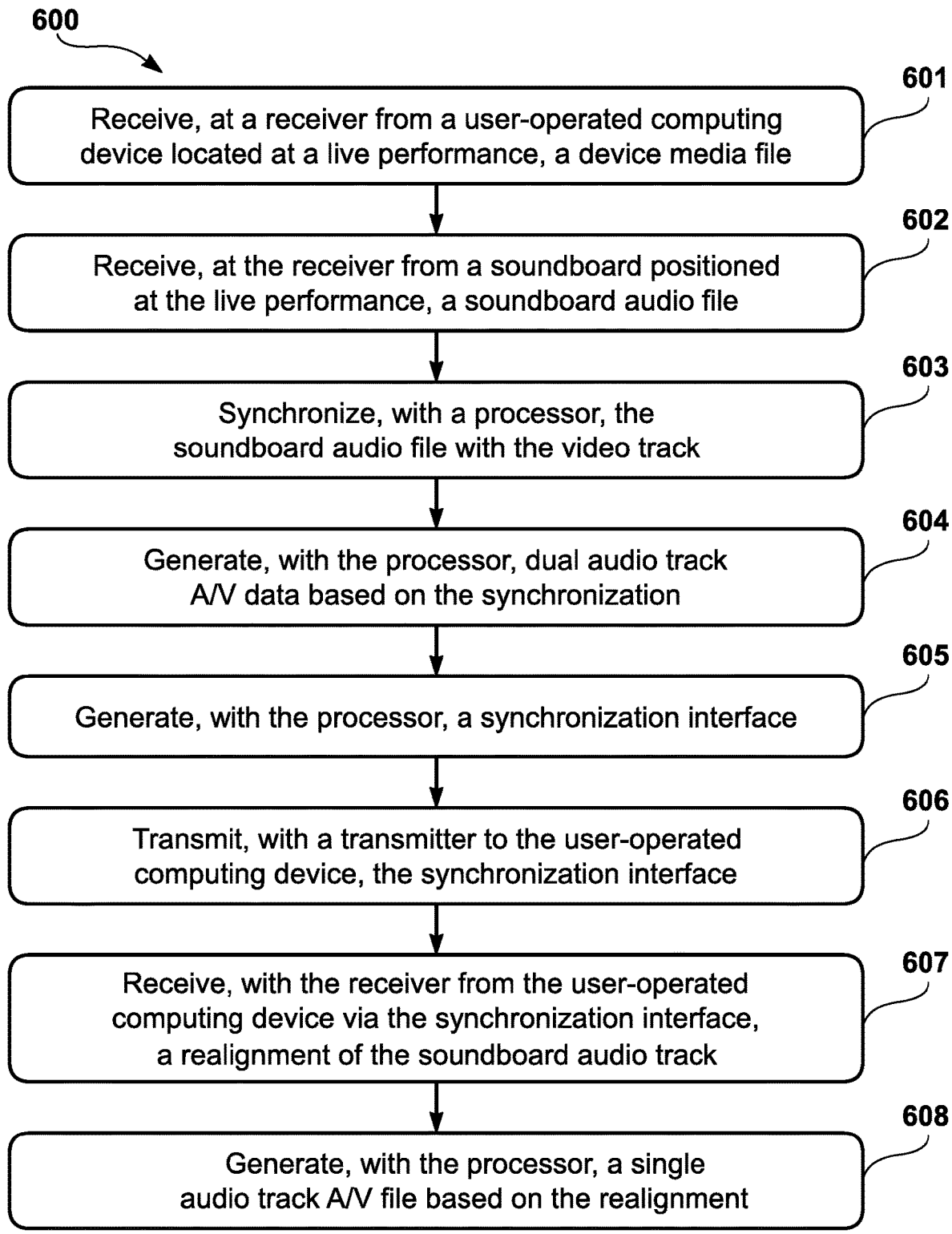
FIG. 6 illustrates a process that may be used by the media synchronization platform to generate a single audio track A/V data.

FIG. 6 illustrates a process 600 that may be used by the media synchronization platform 101 to generate a single audio track A/V file. At a process block 601, the process 600 receives, with a receiver form the user-operated computing device 102 located at the live performance, a device media file after completion of the live performance. The device media file has a device video track and a device audio track. Further, at a process block 602, the process 600 receives, at the receiver from a soundboard 103 positioned at the live event, a soundboard audio file after the completion of the live performance. The soundboard audio file has a soundboard audio track. Moreover, at a process block 603, the process 600 synchronizes, with the processor 201, the soundboard audio track with the video track. The processor 201 is remotely positioned from the live performance. Additionally, at a process block 604, the process 600 generates, with the processor 201, dual audio track A/V data based on the synchronization. Furthermore, at a process block 605, the process 600 generates, with the processor 201, a synchronization interface 506, as illustrated in FIG. 5A or 5B. At a process block 606, the process 600 transmits, with a transmitter, the synchronization interface 506 to the user-operated computing device 102. Additionally, at a process block 607, the process 600 receives, with the receiver from the user-operated computing device 102 via the synchronization interface 506, a realignment of the soundboard audio track. Finally, at a process block 608, the process 600 generates, with the processor 201, a single audio track A/V file based on the realignment.

Although the term "file" is used in various instances herein, the configurations provided for herein may be implemented with one or more files. Accordingly, one or more data blocks may be organized into one or more files for transmission/reception by the various componentry provided for herein.

A computer is intended herein to include any device that has a specialized processor as described above. For example, a computer may be a PC, laptop computer, set top box, cell phone, smartphone, tablet device, smart wearable device, portable media player, video player, etc. The user computing device configurations provided for herein are discussed in the context of a mobile computing device, but may, alternatively, be implemented via other forms of computers.

It is understood that the apparatuses, systems, computer program products, and processes described herein may also be applied in other types of apparatuses, systems, computer program products, and processes. Those skilled in the art will appreciate that the various adaptations and modifications of the embodiments of the apparatuses described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A computer program product comprising a non-transitory computer readable medium having a computer readable program stored thereon, wherein the computer readable program when executed on a computer causes the computer to:

receive, at a receiver from a user-operated computing device located at a live performance, a device media file, the device media file having a device video track and a device audio track;

receive, at the receiver from a soundboard positioned at the live performance, a soundboard audio file, the soundboard audio file having a soundboard audio track;

synchronize, with a processor, the soundboard audio track with the video track, the processor being remotely positioned from the live performance;

generate, with the processor, dual audio track A/V data based on the synchronization;

generate, with the processor, a synchronization interface;

transmit, with a transmitter to the user-operated computing device, the synchronization interface;

receive, with the receiver from the user-operated computing device via the synchronization interface, a realignment of the soundboard audio track; and generate, with the processor, a single audio track A/V file based on the realignment.

2. The computer program product of claim 1, wherein the computer is further caused to receive the device media file and the soundboard audio file after completion of the live performance.

3. The computer program product of claim 1, wherein the computer is further caused to receive a plurality of data blocks of the device media file and a plurality of data blocks of the soundboard audio file prior to completion of the live performance.

4. The computer program product of claim 3, wherein the computer is further caused to store, at a buffer data structure in a memory device, the plurality of data blocks of the soundboard audio file, without the processor being idle, until the receiver receives a predetermined amount of the plurality of data blocks of the device media file.

5. The computer program product of claim 4, wherein the buffer data structure performs the temporary storage of the plurality of data blocks of the soundboard audio file according to an amount of time that corresponds to a humanly perceivable delay.

6. The computer program product of claim 5, wherein the synchronization interface has one or more visual alignment indicia that interactively receive one or more user inputs indicating the realignment.

7. The computer program product of claim 1, wherein the synchronization interface has one or more blending indicia that interactively receive one or more user inputs indicating a blending ratio for blending the soundboard audio track and the device audio track.

8. A mobile computing device comprising:
a display device;
a media capture device that captures media content during a live performance at a live performance environment;
a processor that generates a device media file during the live performance, renders a synchronization interface on the display device, and generates an audio track realignment of a soundboard audio track based on one or more user inputs received via the synchronization interface, the device media file having a device video track and a device audio track,
a transmitter that transmits, from the live performance environment to a cloud-based media synchronization platform, the device media file and transmits the one or more user inputs inputted at the synchronization interface to the cloud-based media synchronization platform; and
a receiver that receives, from the cloud-based media synchronization platform, the synchronization interface and receives, from the cloud-based media synchronization platform, dual audio track A/V data based on a synchronization of the device audio track with the soundboard audio track received by the cloud-based media synchronization platform from a soundboard positioned within the live performance environment, the synchronization being performed by the cloud-based media synchronization platform.

9. The mobile computing device of claim 8, wherein the transmitter transmits the device media file and the soundboard audio file after completion of the live performance.

10. The mobile computing device of claim 8, wherein the transmitter transmits a plurality of data blocks of the device media file and a plurality of data blocks of the soundboard audio file prior to completion of the live performance.

11. The mobile computing device of claim 10, wherein the synchronization interface has one or more visual alignment indicia that interactively receive one or more user inputs indicating the realignment.

12. The mobile computing device of claim 10, wherein the synchronization interface has one or more blending indicia that interactively receive one or more user inputs indicating a blending ratio for blending the soundboard audio track and the device audio track.

13. The mobile computing device of claim 8, wherein the one or more user inputs received via the synchronization interface are touch-based.

* * * * *